(12) United States Patent
Aschaber et al.

(10) Patent No.: US 8,985,665 B2
(45) Date of Patent: Mar. 24, 2015

(54) MOTOR VEHICLE WITH A SEAT BENCH

(71) Applicant: MAGNA STEYR Fahrzeugtechnik AG & CO. KG, Graz (AT)

(72) Inventors: Christoph Aschaber, Graz (AT); Thomas Auer, Metnitz (AT); Manuel Erlacher, Radenthein (AT); Martin Rodler, Krottendorf (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/763,869

(22) Filed: Feb. 11, 2013

(65) Prior Publication Data

US 2013/0207428 A1     Aug. 15, 2013

(30) Foreign Application Priority Data

Feb. 10, 2012   (EP) .................................... 12154890

(51) Int. Cl.
*B60N 2/32* (2006.01)
*B60N 2/22* (2006.01)
*B60N 2/30* (2006.01)
*B60R 21/02* (2006.01)

(52) U.S. Cl.
CPC .. *B60N 2/32* (2013.01); *B60N 2/22* (2013.01); *B60N 2/3031* (2013.01); *B60N 2/305* (2013.01); *B60R 21/026* (2013.01)
USPC ........ 296/65.09; 296/69; 296/24.43; 297/335

(58) Field of Classification Search
CPC ............. B60N 2/32; B60N 2002/0216; B60N 2002/32; B60N 2002/247
USPC ................ 296/65.01, 65.05, 65.09, 69, 24.4, 296/24.43; 297/14, 331, 334–336
See application file for complete search history.

(56) References Cited

U.S. PATENT DOCUMENTS

| | | | |
|---|---|---|---|
| 6,217,096 B1 * | 4/2001 | Koiwa et al. | 296/24.43 |
| 6,305,741 B1 * | 10/2001 | Fernandez | 297/14 |
| 7,559,667 B2 * | 7/2009 | Holderman | 362/131 |
| 7,762,604 B1 * | 7/2010 | Lindsay | 296/64 |
| 2003/0047954 A1 * | 3/2003 | Corder et al. | 296/24.1 |
| 2009/0058157 A1 * | 3/2009 | Fisher et al. | 297/331 |

FOREIGN PATENT DOCUMENTS

| | | | |
|---|---|---|---|
| DE | 4128554 A1 | * | 3/1992 |
| FR | 2663270 | * | 12/1991 |
| FR | 2876637 A1 | * | 4/2006 |

(Continued)

*Primary Examiner* — Dennis H Pedder
(74) *Attorney, Agent, or Firm* — Jordan IP Law, LLC; Todd A. Vaughn

(57) ABSTRACT

A motor vehicle with a seat bench which includes a seat surface which is approximately horizontal in a normal position and a backrest which is approximately vertical in the normal position, wherein the seat surface and the backrest are adjustable into a partition position in which the seat surface and the backrest adopt an at least approximately vertical position and the backrest is arranged above the seat surface. The backrest upper edge is in contact with the roof of the motor vehicle in the partition position, such that the backrest together with the seat surface forms a partition which separates the region behind the partition in the direction of travel from the region in front of the partition in the direction of travel.

17 Claims, 3 Drawing Sheets

(56) References Cited

FOREIGN PATENT DOCUMENTS

| | | | |
|---|---|---|---|
| FR | 2923188 A1 * | 5/2009 | |
| JP | S61-147629 A | 7/1986 | |
| JP | 2000-071830 A | 3/2000 | |
| JP | 2004-331056 A | 11/2004 | |
| JP | 2009-078669 A | 4/2009 | |
| JP | 2009-107372 A | 5/2009 | |

* cited by examiner

MOTOR VEHICLE WITH A SEAT BENCH

CROSS-REFERENCE TO RELATED APPLICATIONS

The present application claims priority under 35 U.S.C. §119 to European Patent Application No. EP 12154890.3 (filed on (Feb. 10, 2012), which is hereby incorporated by reference in its entirety.

TECHNICAL FIELD

Embodiments relate to a motor vehicle having a seat bench which comprises a seat surface which is approximately horizontal in a normal position and a backrest which is approximately vertical in the normal position.

BACKGROUND

Seat benches for motor vehicles having a seat surface and a back rest are generally known.

DE 100 39 789 A1 discloses a motor vehicle with a seat or a seat bench, in which the seat cushion of the seat is mounted so as to be adjustable between a horizontal position and a vertical position via a pivot axis arranged in the front end section of the seat cushion. A partition is provided which is mounted on or in the seat cushion so as to be retractable and extendable, wherein the partition protrudes upward from the seat cushion in a use position. In this case, the backrest is adjustable into a horizontal position in which the rear side of the backrest adjoins the loading compartment floor in an approximately flush manner, thus extending the loading compartment floor. The extendable partition is required in order to form a separation between a front interior space and a rear interior space.

SUMMARY

Embodiments are related to a motor vehicle having a seat bench configured to permit separation between a front and a rear region in the motor vehicle in a simple, cost-effective and space-saving manner.

Embodiments are related to a motor vehicle with a seat bench which includes at least one of the following: a seat surface which is approximately horizontal in a normal position and a backrest which is approximately vertical in the normal position, in which the seat surface and the backrest are adjustable into a partition position in which the seat surface and the backrest adopt an at least approximately vertical position with respect to the roof and/or floor of the motor vehicle and the backrest is spatially arranged above the seat surface in a manner such that the backrest upper edge is in direct or indirect contact with the roof of the motor vehicle in the partition position. In the partition position, the backrest and the seat surface are configured to combine into a single structure forming a partition which separates the region behind the partition in the direction of travel from the region in front of the partition in the direction of travel.

In accordance with embodiments, the backrest and the seat surface are adjustable, for example, pivotably adjustable, in such a manner that they can both be brought into an approximately vertical position with respect to the roof and/or floor of the motor vehicle. In the vertical position, the rear side of the backrest and the lower side of the seat surface are spatially oriented to the rear in a direction of travel (e.g., forward drive) of the motor vehicle. The backrest and the seat surface are geometrically designed in such a manner that the upper edge of the backrest reaches and directly connects to the roof (e.g., roof lining) of the motor vehicle on the inside thereof in the partition position, i.e., is customarily connected to a roof lining. The contact and/or connection with the roof lining may also take place indirectly via flat intermediate elements, such as, for example, sealing lips. The partition that includes the backrest and seat surface, however, substantially separates the entire height of the interior space of the motor vehicle, from the floor as far as the roof.

In accordance with embodiments, the backrest is mounted pivotably on the seat surface via a first pivot axis in the rear region of the seat surface, the seat surface is mounted pivotably on the vehicle frame via a second pivot axis in the front region of the seat surface, and the seat surface and the backrest are pivotable about the first and second pivot axes into the partition position. Such an arrangement of pivot axes constitutes a cost-effective adjustment mechanism for adjusting the backrest and the seat surface in the abovementioned vertical positions of the partition position. In addition, in the normal position, the first pivot axis is configured to be used to adjust the inclination of the backrest in such a manner that comfortable sitting in a manner meeting the individual requirements of a vehicle occupant on the seat bench is made possible.

In accordance with embodiments, the backrest upper edge extends over the entire width of the roof of the motor vehicle, and the backrest upper edge is in contact over the entire width with the roof of the motor vehicle in the partition position. The backrest upper edge, therefore, substantially covers the entire width of the motor vehicle in the region of the roof lining, thus ensuring better separation.

In accordance with embodiments, the seat surface and the backrest are structurally designed in such a manner that the partition covers the entire cross section of the motor vehicle in the partition position. The partition, which is formed from the backrest and the seat surface, therefore, reaches both in height from the floor as far as the ceiling of the vehicle and in width from one side of the vehicle as far as the opposite side, from a B pillar as far as the opposite B pillar, for example. The seat surface and the backrest are shaped in such a manner that the contour of the partition substantially corresponds to the contour of the vehicle interior space and, as a result, covers the entire cross section. This ensures an optimum separating effect of the partition.

In accordance with embodiments, a motor vehicle includes at least one of the following: a seat bench having a seat surface which lies in an approximately horizontal plane in a normal position and a backrest which lies in an approximately vertical plane in the normal position. The seat surface and the backrest are configured for manipulation into a partition position in which the backrest and the seat surface collectively form a partition which separates a first region behind the partition in a direction of travel of the motor vehicle from a second region in front of the partition in the direction of travel of the motor vehicle. In the partition position, the seat surface and the backrest are in at least an approximately vertical position such that the backrest is arranged spatially above the seat surface and an upper edge of the backrest upper edge is in contact with a roof of the motor vehicle.

In accordance with embodiments, a motor vehicle includes at least one of the following: a roof; a seat bench comprising: (i) a seat surface configured for movement between a first position in which the seat is spatially arranged approximately parallel to the roof and a second position in which the seat is spatially arranged approximately perpendicular to the roof, and (ii) a backrest configured for movement between a first position in which the backrest is spatially arranged approximately perpindicular to the roof and a second position in which the backrest is spatially arranged approximately perpendicular to the roof. In the second position, the seat surface and the backrest combine to form a partition separating a front region of the motor vehicle from a rear region of the motor vehicle.

In accordance with embodiments, at least one sealing element is arranged in the interior space of the motor vehicle, said sealing element sealing a contact region between the partition and the motor vehicle in the partition position. In a particularly preferred manner, one or more sealing elements are arranged over relatively large sections or over the entire contour of the connecting lines between the partition and motor vehicle. Sealing lips in particular can be used as the sealing elements.

In accordance with embodiments, the partition separates the region behind the partition in the direction of travel from the region in front of the partition in the direction of travel in an approximately soundproof, hermetic (watertight) and/or airtight manner in the partition position. The backrest, seat surface and possible sealing elements are, therefore, advantageously designed in such a manner that the front interior space is protected in the best possible manner from the region behind the partition, in particular in respect of noise, wind or ingress of water from the rear region.

In an advantageous manner, at least one fixing element is arranged in the interior space of the motor vehicle, said fixing element being designed to fix the backrest and/or the seat surface in the at least approximately vertical position to the motor vehicle in the partition position. This ensures secure holding of the partition in the upright position even while underway.

In accordance with embodiments, the roof of the motor vehicle includes at least one of the following: a removable and/or displaceable and/or foldable roof element which lies behind the partition in the direction of travel in the partition position of the seat bench. A rear part of the roof is, therefore, removable and/or displaceable and/or foldable in a forward and/or rearward direction as a whole or in segments, for example, as in the case of a known sliding folding roof. In this advantageous manner, by erecting the seat surface and backrest to form the partition position and removing or displacing or folding the rear roof element, a vehicle having a loading surface which is open at the rear, corresponding to a known pick up is produced.

In accordance with embodiments, the backrest includes at least one of the following: at least one transparent region which is configured in such a manner that the view from the region in front of the partition in the direction of travel into the region behind the partition in the direction of travel is made possible. The view into the rear region of the vehicle, i.e., for example, into the loading compartment, is thereby possible despite an erected partition.

In accordance with embodiments, the backrest includes at least one of the following: a backrest rear wall, and the backrest rear wall is formed from a transparent material, in particular, from glass or plastic, in the at least one transparent region. The backrest thereby provides the rigidity of a backrest rear wall that nevertheless makes it possible to look into the region behind the partition.

In accordance with embodiments, the backrest can comprise upholstery. The upholstery can preferably have a structure configured to be removed, in particular, can be folded away, for example, in a direction forwards in the direction of travel, in the at least one transparent region. In this advantageous manner, even in the case of an opaque design of the upholstery, a transparent region is produced in the backrest as soon as the upholstery is removed or folded away.

In accordance with embodiments, the upholstery is formed by a transparent, air-filled cushion, in the at least one transparent region. This makes it possible to see through the partition without removing the upholstery or part of the upholstery.

In accordance with embodiments, a flat loading floor element which, in the normal position of the seat bench, is substantially located under the seat surface is raised in the partition position of the seat bench such that the loading floor element lies in one plane with a loading floor of the motor vehicle in the partition position. A loading floor element which is flat, is designed as a panel and, in the normal position, is located under the seat surface, customarily in a seat bench trough and, as a result, is located below the level of a loading floor in the rear vehicle region, can be raised in such a manner that it comes to lie on the level of the loading floor in the partition position. This results in an enlargement of the loading floor or in a continuously flat loading floor which reaches as far as the partition.

The seat surface and the backrest are preferably adjustable, in particular pivotable, into the partition position via a servomotor. In this advantageous manner, manual adjustment of the seat bench is not required in order to form the partition.

In accordance with embodiments, the loading floor element is configured to be manipulated in a raised position automatically via the servomotor. In particular, the loading floor element is configured to be manipulated in raised position automatically via a servomotor simultaneously with adjustment (e.g., pivotal) of the seat surface and the backrest are also adjusted into the partition position, preferably via the same servomotor. In the advantageous manner, the partition can be erected and the loading floor extended at the same time (i.e., simultaneously) without effort. Of course, the loading floor element may also be raised via a second servomotor which is different from the servomotor for adjusting the seat surface and backrest.

DRAWINGS

Embodiments are described by way of example below with reference to the drawings.

DESCRIPTION

Figure 1:
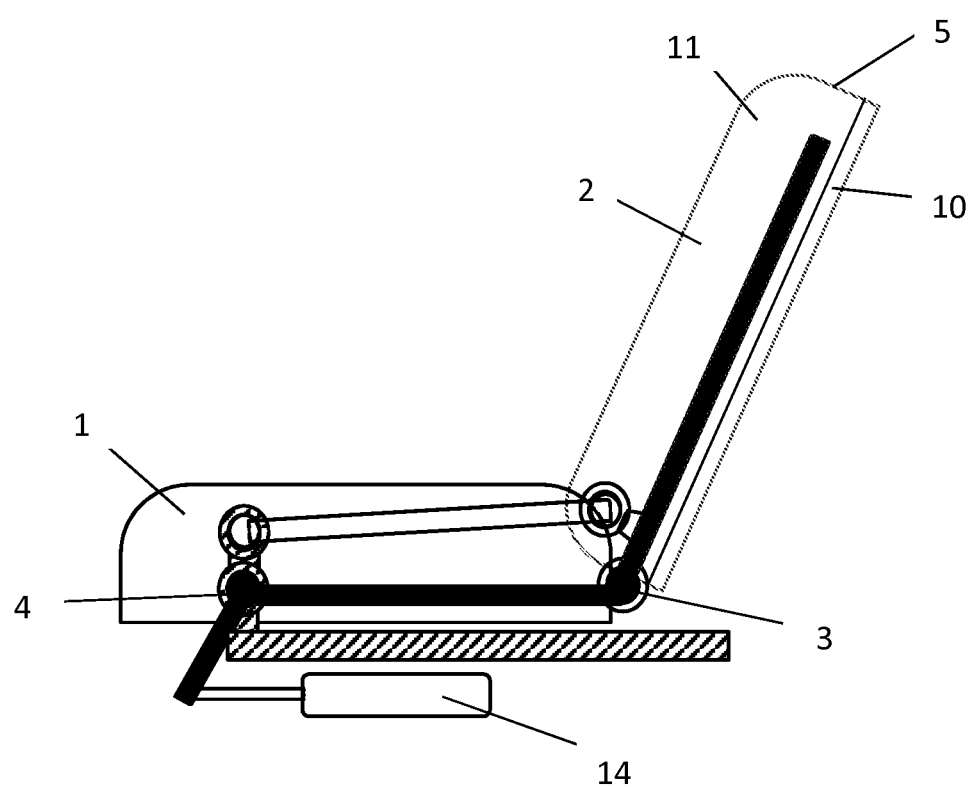
FIG. 1 illustrates a side view of a seat bench in accordance with embodiments.

FIG. 1 illustrates schematically a side view of a seat bench in accordance with embodiments. The seat bench includes a seat surface 1 and a backrest 2 composed of a backrest rear wall 10 and upholstery 11. The backrest upper edge 5 is located at the upper end of the backrest 2, which end lies opposite the first pivot axis 3. In this case, the backrest 2 is pivotable relative to the seat surface 1 about a first pivot axis 3 in the rear region of the seat surface 1. The seat surface 1 itself is mounted pivotably on the vehicle frame via a second pivot axis 4. The backrest 2 and the seat surface 1 are connected to each other in such a manner that they are manipulated by actuation via a servomotor 14 causes the backrest 2 and the seat surface 1 to be erected into an approximately vertical position. For this purpose, different folding mechanisms are known in the prior art, such as, for example, the illustrated use of an actuating rod or else the use of a chain or toothed belt system.

Figure 2A:
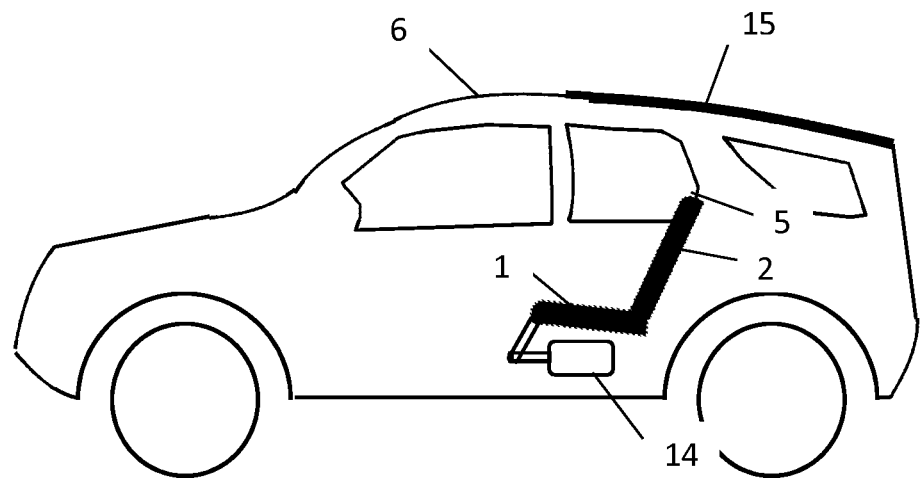
FIGS. 2a to 2c illustrates a side view of a motor vehicle having the seat bench of FIG. 1 in a transition from a normal position to a partition position.
Figure 2B:
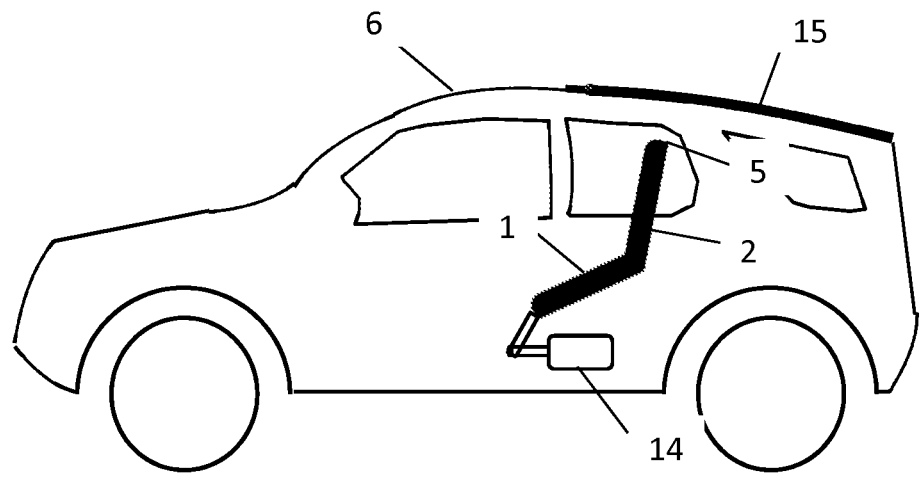
Figure 2C:
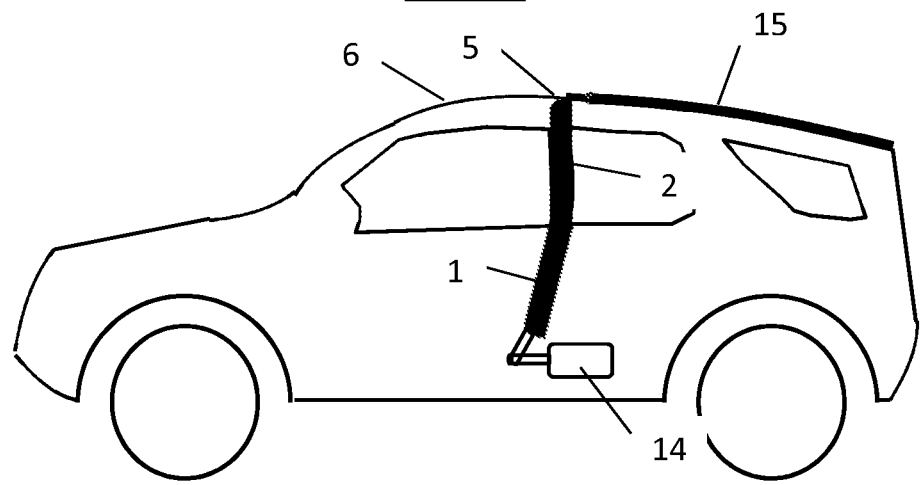

FIGS. 2a to 2c are schematic illustrations of the seat bench in accordance with embodiments in a motor vehicle, the illustrations showing a transition of the seat bench from a normal position (FIG. 2a) via an intermediate position (FIG. 2b) to the partition position (FIG. 2c). In the partition position which is illustrated in FIG. 2c, the partition consisting of the seat surface 1 and backrest 2 runs as far as the roof 6 of the vehicle. A roof element 15, which is configured for manipulation in removable and/or displaceable positions (completely or, for example, in segments), is located spatially behind the contact line between the backrest upper edge 5 and the roof 6 of the motor vehicle in the direction of travel. In the illustrated embodiment, the entire rear roof region as far as the tailgate of the motor vehicle is removable or displaceable, completely or in segments. In the opposite direction, the partition can also be transferred again with the aid of the servomotor 14 from the partition position of FIG. 2c via the intermediate position of FIG. 2b into the normal position, i.e., the formation of the customary seat surface 1 and backrest 2 of FIG. 2a.

Figure 3:
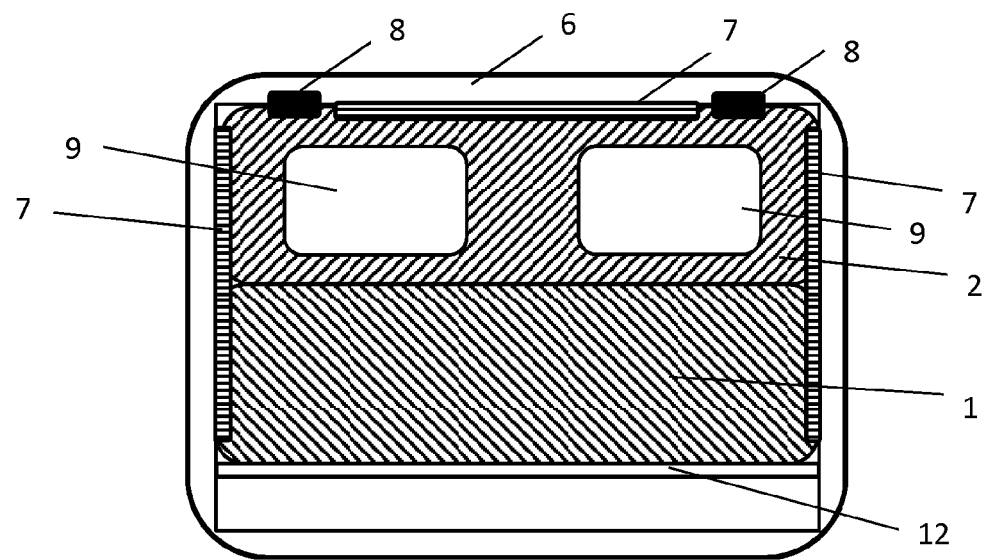
FIG. 3 illustrates a cross-sectional view of a motor vehicle with a seat bench in cross section.

FIG. 3 is a schematic illustration which shows a motor vehicle in accordance with embodiments with a seat bench in cross-section. In this case, substantially the entire cross-section of the motor vehicle is covered by the seat surface 1 and the backrest 2. The loading floor element 12 which is now raised is located in the lower region and, in the illustrated partition position, is located at the same height as a loading floor which is present in any case. Transparent regions 9 are formed in the backrest 2 by the fact that said regions do not have any upholstery or have transparent upholstery and a possibly present backrest rear wall is of transparent design. The backrest 2 is fixed to the roof 6 of the motor vehicle with the aid of fixing elements 8. Furthermore, sealing elements 7 are arranged between the seat surface 1 or the backrest 2 and the frame of the motor vehicle, i.e., the roof 6, the side walls and possibly, not illustrated, the loading floor element 12. The contact surfaces between the partition and the vehicle are thereby sealed.

Figure 4:
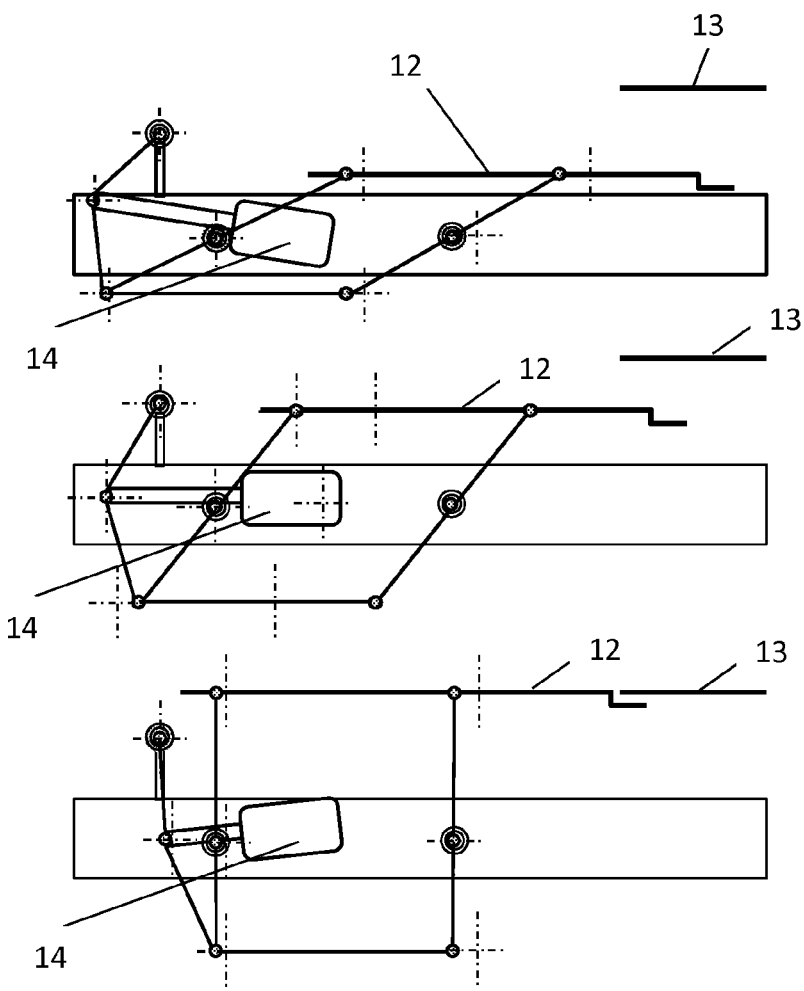
FIG. 4 illustrates a schematic sequence of the raising of a loading floor element in three phases.

FIG. 4 illustrates the kinematics of raising the loading floor in a schematic sequence illustration. In the uppermost illustration of FIG. 4, the loading floor element 12 is still located significantly under the normal loading floor 13 which forms the floor of a loading compartment behind the seat bench. The loading floor element 12 is raised to the height of the loading floor 13 via the servomotor 14 and linkage correspondingly mounted on the vehicle, as illustrated at the bottom in FIG. 4.

In accordance with embodiments, a motor vehicle has a seat bench configured to permit a separation between a front and a rear region in the motor vehicle in a simple, cost-effective and space-saving manner.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor vehicle comprising:
a seat bench having a seat surface which lies in an approximately horizontal plane in a normal position and a backrest which lies in an approximately vertical plane in the normal position and spaced from a roof of the motor vehicle,
wherein the seat surface and the backrest are configured for manipulation between the normal position in which an upper edge of the backrest is spaced from a roof of the motor vehicle, and a partition position in which the backrest and the seat surface collectively form a partition which separates a first region behind the partition in a direction of travel of the motor vehicle from a second region in front of the partition in the direction of travel of the motor vehicle,
wherein in the partition position, the seat surface and the backrest are in at least an approximately vertical position such that the backrest is arranged spatially above the seat surface and the upper edge of the backrest is in contact with the roof of the motor vehicle.

2. The motor vehicle of claim 1, wherein:
the backrest is pivotably mounted on the seat surface via a first pivot axis in a rear region of the seat surface and is pivotable about the first pivot axis into the partition position;
the seat surface is pivotably mounted on a frame of the motor vehicle via a second pivot axis in a front region of the seat surface and is pivotable about the second pivot axis into the partition position.

3. The motor vehicle of claim 1, wherein:
the upper edge of the backrest extends over an entire width of the roof of the motor vehicle; and
in the partition position, the upper edge of the backrest is in contact with the roof over the entire width of the roof.

4. The motor vehicle of claim 1, wherein in the partition position, the seat surface and the backrest are configured in such a manner that the partition covers the entire cross-section of the motor vehicle.

5. The motor vehicle of claim 1, further comprising at least one sealing element arranged in an interior space of the motor vehicle, said sealing element configured to seal a contact region between the partition and the motor vehicle when the seat surface and the back rest are in the partition position.

6. The motor vehicle of claim 1, wherein the partition is configured to provide a soundproof, watertight and/or airtight partition between the region behind the partition in the direction of travel and the region in front of the partition in the direction of travel.

7. The motor vehicle of claim 1, further comprising at least one fixing element arranged in an interior space of the motor vehicle, the fixing element being configured to fix the backrest and/or the seat surface in the partition position.

8. The motor vehicle of claim 1, wherein the roof of the motor vehicle comprises at least one of a removable roof element, a displaceable roof element and a foldable roof element which lies behind the partition in the direction of travel in the partition position.

9. The motor vehicle of claim 1, wherein the backrest comprises a backrest rear wall composed of a transparent material in the at least one transparent region.

10. The motor vehicle of claim 1, wherein the backrest comprises upholstery.

11. The motor vehicle of claim 10, wherein the upholstery is configured to be removable and/or foldable in the at least one transparent region.

12. The motor vehicle of claim 10, wherein the upholstery comprises a transparent, air-filled cushion, in the at least one transparent region.

13. The motor vehicle of claim 1, further comprising a loading floor element which, in the normal position of the seat bench, is located under the seat surface, and configured such that, in the partition position of the seat bench, lies in one plane with a loading floor of the motor vehicle.

14. A motor vehicle comprising:
   a roof; and
   a seat bench having:
      a seat surface configured for movement between a first position in which the seat is spatially arranged approximately parallel to the roof and a second position in which the seat is spatially arranged approximately perpendicular to the roof; and
      a backrest configured for movement between a first position in which the backrest is spatially arranged approximately perpendicular to the roof and spaced from a roof of the motor vehicle, and a second position in which the backrest is spatially arranged approximately perpendicular to the roof,
   wherein in the second position, the seat surface and the backrest combine to form a partition separating a front region of the motor vehicle from a rear region of the motor vehicle in which an upper edge of the backrest contacts the roof.

15. The motor vehicle of claim 14, wherein:
   the backrest is pivotably mounted on the seat surface via a first pivot axis in a rear region of the seat surface and is pivotable about the first pivot axis into the second position;
   the seat surface is pivotably mounted on a frame of the motor vehicle via a second pivot axis in a front region of the seat surface and is pivotable about the second pivot axis into the second position.

16. The motor vehicle of claim 14, wherein the partition is configured to provide a soundproof, watertight and/or airtight partition between the front region of the motor vehicle and the rear region of the motor vehicle.

17. A motor vehicle, comprising:
   a seat bench having a seat surface which lies in an approximately horizontal plane in a normal position; and
   a backrest which lies in an approximately vertical plane in a normal position in which an upper edge thereof is spaced from a roof of the motor vehicle,
   wherein:
      the seat surface and the backrest are configured for movement between the normal position and a partition position in which the backrest and the seat surface collectively form a partition which separates a first region and a second region of the motor vehicle and the upper edge of the backrest upper edge is in contact with a roof of the motor vehicle; and
      a loading floor element is configured for movement, via a servomotor, into a raised position simultaneously when the seat surface and the backrest are in the partition position.

* * * * *